United States Patent
Vikberg et al.

(10) Patent No.: US 11,457,348 B2
(45) Date of Patent: Sep. 27, 2022

(54) SIM PROVISIONING

(71) Applicant: Telefonaktiebolaget LM Ericsson (publ), Stockholm (SE)

(72) Inventors: Jari Vikberg, Järna (SE); Kjell Gustafsson, Lund (SE); Tomas Hedberg, Nacka (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 0 days.

(21) Appl. No.: 16/643,107

(22) PCT Filed: Aug. 30, 2017

(86) PCT No.: PCT/EP2017/071791
§ 371 (c)(1),
(2) Date: Feb. 28, 2020

(87) PCT Pub. No.: WO2019/042541
PCT Pub. Date: Mar. 7, 2019

(65) Prior Publication Data
US 2020/0396593 A1    Dec. 17, 2020

(51) Int. Cl.
*H04W 4/00* (2018.01)
*H04M 1/00* (2006.01)
(Continued)

(52) U.S. Cl.
CPC ............ *H04W 8/205* (2013.01); *H04W 8/24* (2013.01); *H04W 12/068* (2021.01); *H04W 12/08* (2013.01); *H04W 12/72* (2021.01)

(58) Field of Classification Search
None
See application file for complete search history.

(56) References Cited

U.S. PATENT DOCUMENTS

2011/0306318 A1* 12/2011 Rodgers ............... H04L 67/16
455/410
2015/0271662 A1    9/2015 Lhamon et al.
(Continued)

FOREIGN PATENT DOCUMENTS

WO    2016005795 A1    1/2016
WO    2017041299 A1    3/2017

OTHER PUBLICATIONS

Iacopino, Pablo, et al., "The future of the SIM: potential market and technology implications for the mobile ecosystem", GSMA Intelligence, Feb. 2017, pp. 1-32.
(Continued)

*Primary Examiner* — Gary Lafontant
(74) *Attorney, Agent, or Firm* — Christopher & Weisberg, P.A.

(57) ABSTRACT

The present disclosure relates to methods, arrangements and computer program products for remote subscriber identification module (SIM) provisioning. When performed in a telematics control arrangement, the SIM provisioning method comprises establishing a wireless connection with one or more SIM profile management arrangement and obtaining a plurality of SIM profiles from at least one of the one or more SIM profile management arrangements based on location information for the telematics control arrangement and/or on capabilities of wireless communication resources accessible to the telematics control arrangement. Each SIM profile comprises personalized SIM information for communication in at least one wireless communication network of a respective service provider.

20 Claims, 7 Drawing Sheets

(51) Int. Cl.
  *H04W 8/20*   (2009.01)
  *H04W 8/24*   (2009.01)
  *H04W 12/08*  (2021.01)
  *H04W 12/06*  (2021.01)
  *H04W 12/72*  (2021.01)

(56) References Cited

U.S. PATENT DOCUMENTS

| | | |
|---|---|---|
| 2015/0304506 A1 | 10/2015 | Zhu et al. |
| 2016/0157085 A1 | 6/2016 | Yeoum et al. |
| 2016/0192312 A1 | 6/2016 | Lambert et al. |
| 2017/0048713 A1 | 2/2017 | Guday et al. |

OTHER PUBLICATIONS

Unknown, Author, "Remote Provisioning Architecture for Embedded UICC Test Specification", GSM Association; Version 3.2, Jun. 27, 2017, pp. 1-592.

Unknown, Author, "RSP Technical Specification", GSM Association; Version 2.2, Sep. 1, 2017, pp. 1-262.

Unknown, Author, "RSP Technical Specification", GSM Association, Version 1.2, Feb. 27, 2017, pp. 1-128.

Unknown, Author, "Understanding SIM evolution", GSMA Intelligence, Mar. 2015, pp. 1-17.

\* cited by examiner

SIM PROVISIONING

TECHNICAL FIELD

The present disclosure relates to methods, arrangements and computer program products for remote subscriber identification module (SIM) provisioning.

BACKGROUND

The 3rd Generation Partnership Project, 3GPP, is responsible for the standardization of the Universal Mobile Telecommunication System (UMTS), Long Term Evolution (LTE), and 5G New Radio (NR) defining technologies for realizing high-speed packet-based communication in wireless communication systems. Wireless devices operating in such wireless communication systems are personalized through the use of a subscriber identification module (SIM) that stores a 'SIM profile' used to identify and authenticate a subscriber when using the wireless device in the wireless communication system. The 'SIM profile' may consist of one or more data units, e.g. SIM or CSIM or USIM or ISIM or evolutions of these, including the security parameters associated with these xSIMs. The SIM may be provided as a physical component, e.g. a SIM card or Universal Integrated Circuit Card (UICC) to be inserted into the wireless device, or as a SIM resource arranged for remote provisioning.

The SIMs used in present day wireless devices are normally of a legacy type holding one SIM profile that is provided by the Home Public Land Mobile Network (HPLMN) operator and arranged on a physical resource, e.g., a UICC. Some SIM profile aspects can be remotely updated, but not the entire SIM profile. The Global System for Mobile Communications (GSM) Association, GSMA, offers a standardized solution for embedded UICC (eUICC) technology promoting remote provisioning and management of machine to machine (M2M) connections, allowing "over the air" provisioning of an initial operator subscription, and the subsequent change of subscription from one operator to another. Remote provisioning is the ability to remotely change the SIM profile on a deployed SIM without having to physically change the SIM itself. In order to achieve this, the SIM may be configured with additional memory to hold more than one operator SIM profile. When a consumer purchases a service package from a specific operator, the operator SIM profile is downloaded and saved onto the SIM memory. If a second operator package is subsequently purchased, the new operator SIM profile is downloaded and also saved to the SIM so that both profiles are installed and accessible for use.

GSMA eUICC is an enabler for remote provisioning of complete SIM profiles and is used to represent a type of SIM card that can be remotely provisioned. With the emergence of eUICC, see e.g. GSMA SGP.22 for "Remote SIM Provisioning (RSP) Architecture for consumer Devices' also known as Consumer Profile and SGP.11 "Remote Provisioning Architecture for Embedded UICC Test Specification", http://www.gsma.com/rsp/, there is a new possibility to load, remove, update and/or enable a complete SIM profile when needed, using the above-mentioned SIM resource.

ETSI and GSMA are also about to start specification of integrated UICC (iUICC) also including the capability of remotely provisioning of SIM profile. The iUICC is conceptually a system-on-chip (SoC) solution in which the UICC is integrated as a separate secure processor core alongside other cores. SoC solutions would integrate a secure processor that leverages external non-volatile shared memory, using cryptographic means to protect the data.

Although the above discussed emerging new SIM administration technologies provide for means to remotely change profiles, problems remain with regard to the provisioning of such personalized SIM information from operators to a wireless device.

SUMMARY

An object of the present disclosure is to provide methods which seek to mitigate, alleviate, or eliminate one or more of the above-identified deficiencies in the art.

According to a first aspect, this is achieved by a method for remote subscriber identification module, SIM, profile provisioning of a telematics control arrangement comprisable in a wireless device.

The method comprises establishing a wireless connection with one or more SIM profile management arrangements. The method also comprises obtaining a plurality of SIM profiles from at least one of the one or more SIM profile management arrangements based on location information for the telematics control arrangement and/or on capabilities of wireless communication resources accessible to the telematics control arrangement. Each SIM profile comprises personalized SIM information for communication in at least one wireless communication network of a respective service provider.

In some embodiments, obtaining a plurality of SIM profiles in the telematics control arrangement may comprise transmitting information to the at least one SIM profile management arrangement for SIM profile provisioning, wherein the transmitted information is indicative of the location information for the telematics control arrangement and of the capabilities of wireless communication resources accessible to the telematics control arrangement. The telematics control arrangement receives information from the at least one SIM profile management arrangement identifying the plurality of SIM profiles.

In some embodiments, the method comprises storing the plurality of SIM profiles in the telematics control arrangement.

In some embodiments, the method comprises causing activation in a SIM of at least one of the SIM profiles of the obtained plurality of SIM profiles.

In some embodiments, the causing activation in a SIM of at least one of the obtained plurality of SIM profiles comprises selecting a SIM profile subset comprising one or more SIM profiles from the obtained plurality of SIM profiles; and hosting the selected SIM profile subset in an embedded Universal Integrated Circuit Card, eUICC, or in an integrated UICC, iUICC, of the wireless device.

According to a second aspect, the object of the present disclosure is achieved by a computer readable storage medium, having stored thereon a computer program which, when executed in a telematics control arrangement, causes execution of the method according to the first aspect.

According to a third aspect, the object of the present disclosure is achieved by a telematics control arrangement configured for remote subscriber identification module, SIM, profile provisioning. The telematics control arrangement comprises processing circuitry configured to cause the telematics control arrangement to establish a wireless connection with one or more SIM profile management arrangements and to obtain a plurality of SIM profiles from at least one of the one or more SIM profile management arrangements based on location information for the telematics control arrangement and/or on capabilities of wireless communication resources accessible to the telematics control arrangement. Each SIM profile comprises personalized SIM information for communication in at least one wireless communication network of a respective service provider.

According to a fourth aspect, the object of the present disclosure is achieved by a method of a subscriber identification module, SIM, profile management arrangement for remote SIM profile provisioning to a telematics control arrangement comprisable in a wireless device. The method comprising determining a need for SIM profile provisioning to the telematics control arrangement and selecting a plurality of SIM profiles from a totality of SIM profiles registered in the SIM profile arrangement, wherein the selecting is based on location information for the telematics control arrangement and/or on capabilities of wireless communication resources accessible to the telematics control arrangement. The method further comprises causing transmission of information to the telematics control arrangement identifying the selected plurality of SIM profiles.

In some embodiments, determining a need for SIM profile provisioning comprises establishing a wireless connection with the telematics control arrangement and receiving information from the telematics control arrangement. The received information is indicative of the location information for the telematics control arrangement and the capabilities of wireless communication resources accessible to the telematics control arrangement.

According to a fifth aspect, the object of the present disclosure is achieved by a computer readable storage medium, having stored thereon a computer program which, when executed in subscriber identification module, SIM, profile management arrangement, causes the SIM profile management arrangement to execute the methods according to the fourth aspect.

According to a sixth aspect, the object of the present disclosure is achieved by a subscriber identification module, SIM, profile management arrangement configured for remote subscriber identification module, SIM, profile provisioning, the SIM profile management arrangement comprising processing circuitry configured to cause the telematics control arrangement to determine a need for SIM profile provisioning to the telematics control arrangement and to select a plurality of SIM profiles from a totality of SIM profiles registered in the SIM profile arrangement, wherein the selecting is based on location information for the telematics control arrangement and/or on capabilities of wireless communication resources accessible to the telematics control arrangement. The processing circuitry is further configured to cause transmission of information to the telematics control arrangement identifying the selected plurality of SIM profiles.

In some embodiments, any of the above aspects may additionally have features identical with or corresponding to any of the various features as explained above for any of the other aspects.

The above disclosed aspects provide connectivity and reliable access to communication in scenarios for which the preferred operator may change more or less frequently, e.g., depending on service capability or charging scheme.

BRIEF DESCRIPTION OF DRAWINGS

The foregoing will be apparent from the following more particular description of the example embodiments, as illustrated in the accompanying drawings in which like reference characters refer to the same parts throughout the different views. The drawings are not necessarily to scale, emphasis instead being placed upon illustrating the example embodiments.

DETAILED DESCRIPTION

Figure 1:
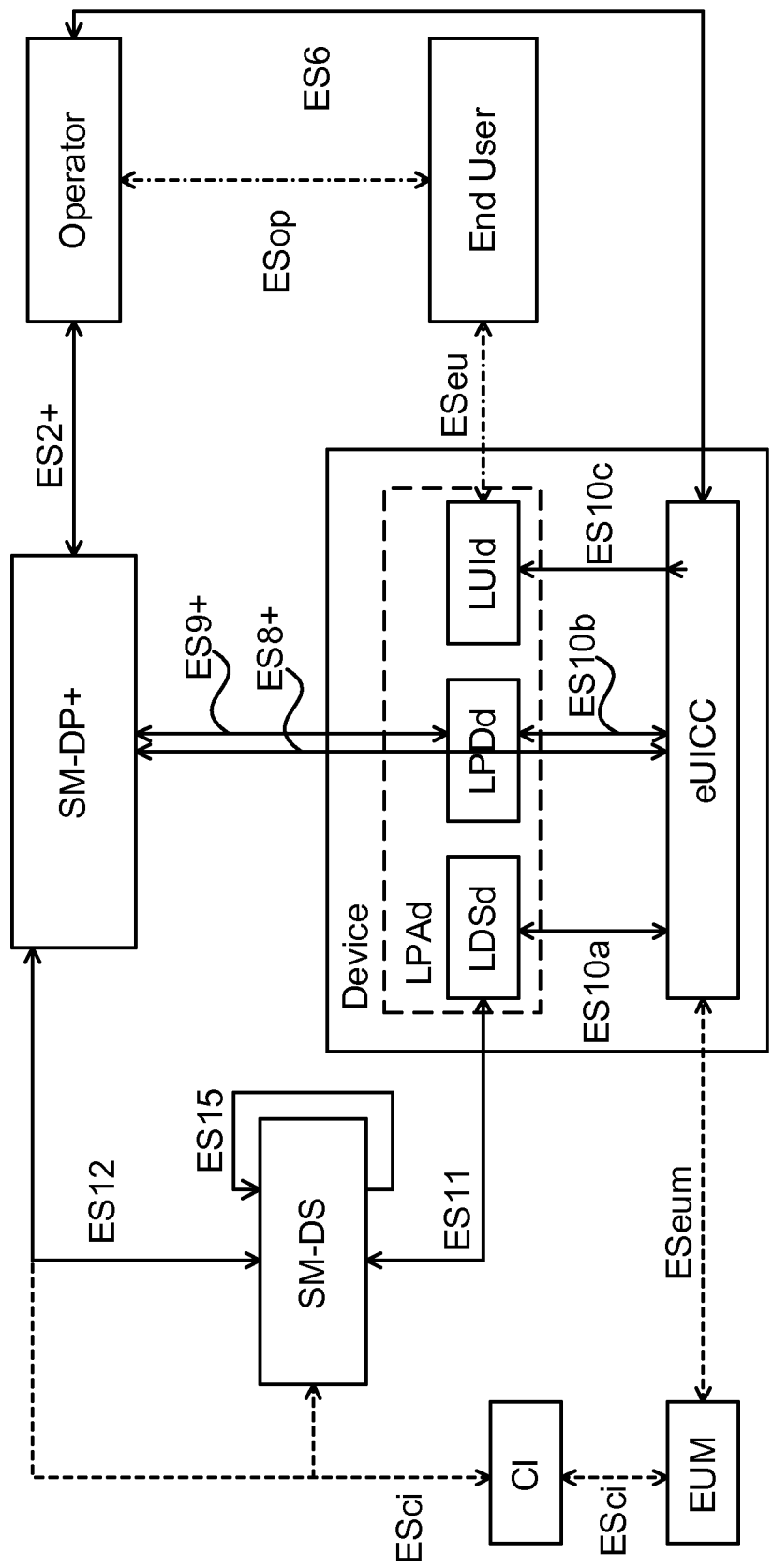
FIG. 1 is a schematic block diagram illustrating an example general architecture for SIM Provisioning for Consumer Profile, relevant in relation to some embodiments.

Embodiments and aspects of the present disclosure will be described more fully hereinafter with reference to the accompanying drawings. The methods and arrangements disclosed herein can, however, be realized in many different forms and should not be construed as being limited to the aspects set forth herein. Like numbers in the drawings refer to like elements throughout.

The terminology used herein is for the purpose of describing particular aspects of the disclosure only, and is not intended to limit the invention. The term "comprises/comprising" when used in this specification is taken to specify the presence of stated features, integers, steps, or components, but does not preclude the presence or addition of one or more other features, integers, steps, components, or groups thereof.

As used herein, the singular forms "a", "an" and "the" are intended to include the plural forms as well, unless the context clearly indicates otherwise.

In the following, embodiments will be described that enable provisioning of mobile devices with a plurality of SIM profiles.

Remote provisioning is the ability to remotely change the SIM profile on a deployed SIM without having to physically change the SIM itself. FIG. 1 illustrates an example general architecture for Remote SIM Provisioning System and Local Profile Assistant (LPA), as disclosed in GSMA Document SGP. 22—RSP Technical Specification, Version 2.1 of 27 Feb. 2017. The general architecture with the interfaces and roles defined in the specification is relevant in relation to some embodiments. As described in the background section, embedded Universal Integrated Circuit Card (eUICC) is an enabler for remote provisioning of complete SIM profiles providing the possibility to load, remove, update and/or enable a complete SIM profile when needed. There also exists a separate, not shown, architecture diagram for the case when LPA is located in the eUICC. The methods proposed in this disclosure can also be used without an LPA, i.e. with the so called M2M variant of embedded UICC (eUICC). This variant may have drawbacks from the presently lacking possibility to enable a SIM profile while being unconnected and lacking the possibility of loading eUICC of one modem via another modem. Nevertheless, the general methods proposed herein can still be used.

'Soft SIM' solutions are also foreseen that would provide the capability of remotely changing SIM profile. Quoting from the GSMA Intelligence report "Understanding SIM evolution, March 2015": "A 'Soft SIM' would be a collection of software applications and data that perform all of the functionality of a SIM card but does not reside in any kind of secure data storage. Instead, it would be stored in the memory and processor of the communications device itself (i.e. there would be no SIM hardware layer)."

Still another area of related solutions is integrated UICC (iUICC) also including the capability of remotely changing SIM profile. Quoting from the GSMA Intelligence report "The future of the SIM: potential market and technology implications for the mobile ecosystem February 2017". "An integrated UICC (iUICC) is conceptually a system-on-chip (SoC) solution in which the UICC is integrated as a separate secure processor core alongside other cores. This is not currently standardized by ETSI but there is a work item looking at standardizing platforms such as iUICC. SoC solutions would integrate a secure processor that leverages external non-volatile shared memory, using cryptographic means to protect the data. The iUICC solution is meant to meet or exceed the current UICC's level of security."

Consequently, the methods proposed in this disclosure are equally applicable to scenarios wherein SIM provisioning is enabled through eUICC, iUICC, soft SIM or through any other type of SIM mechanism open for remote provisioning.

Although the above discussed emerging new SIM administration technologies provide for means to remotely change profiles, problems remain with regard to the provisioning of such personalized SIM information from operators to a wireless device. While emerging new SIM administration technologies provide for means to remotely change profile, the question of which profiles to store in the SIM remains. It may not be reasonable, cost effective or even technically possible to pre-store all potential profiles on an eUICC/iUICC or in the protected area of a soft SIM solution. Also, securing agreements with providers of all profiles would be challenging and in addition there would likely be a cost associated with each profile that is stored even when it is not enabled as the active profile. Hence there is a need for a way to decide on a subset of profiles to store on the eUICC/iUICC as well as mechanisms for deciding when to update this subset.

The present disclosure addresses and solves, mitigates, alleviates or eliminates at least some of the above mentioned problems or other disadvantages associated with remote provisioning, and the disclosure is applicable to any type of programmable SIM; independent of the SIM form factor. Example of such form factors include removable SIM solutions, embedded SIM solutions, integrated UICC solutions, soft SIM solutions and so called trusted execution environments for storing operator profiles. A SIM profile management arrangement is proposed to manage provisioning with a plurality of SIM profiles representing the most relevant SIM profiles. A too small set of profiles may limit access to communication by not having the appropriate profile available when needed. On the other hand, having an excess of profiles stored on the eUICC/iUICC may incur unnecessary cost. Thus, by having easy access to a set of relevant profiles, it is possible to secure reliable access to communication at a controlled cost.

According to some embodiments disclosed herein, functionality is introduced that manages the set of SIM profiles stored, e.g., on the eUICC or iUICC. This functionality relies on information provided from a wireless device or a user equipment (UE), e.g., network availability, geographical position, etc., and/or information available on the network side, e.g. available operator contracts, statistics from SIM profiles used by other UEs, etc. Change of SIM profiles, e.g., by adding or deleting SIM profiles, is initiated based on this information.

Figure 2:
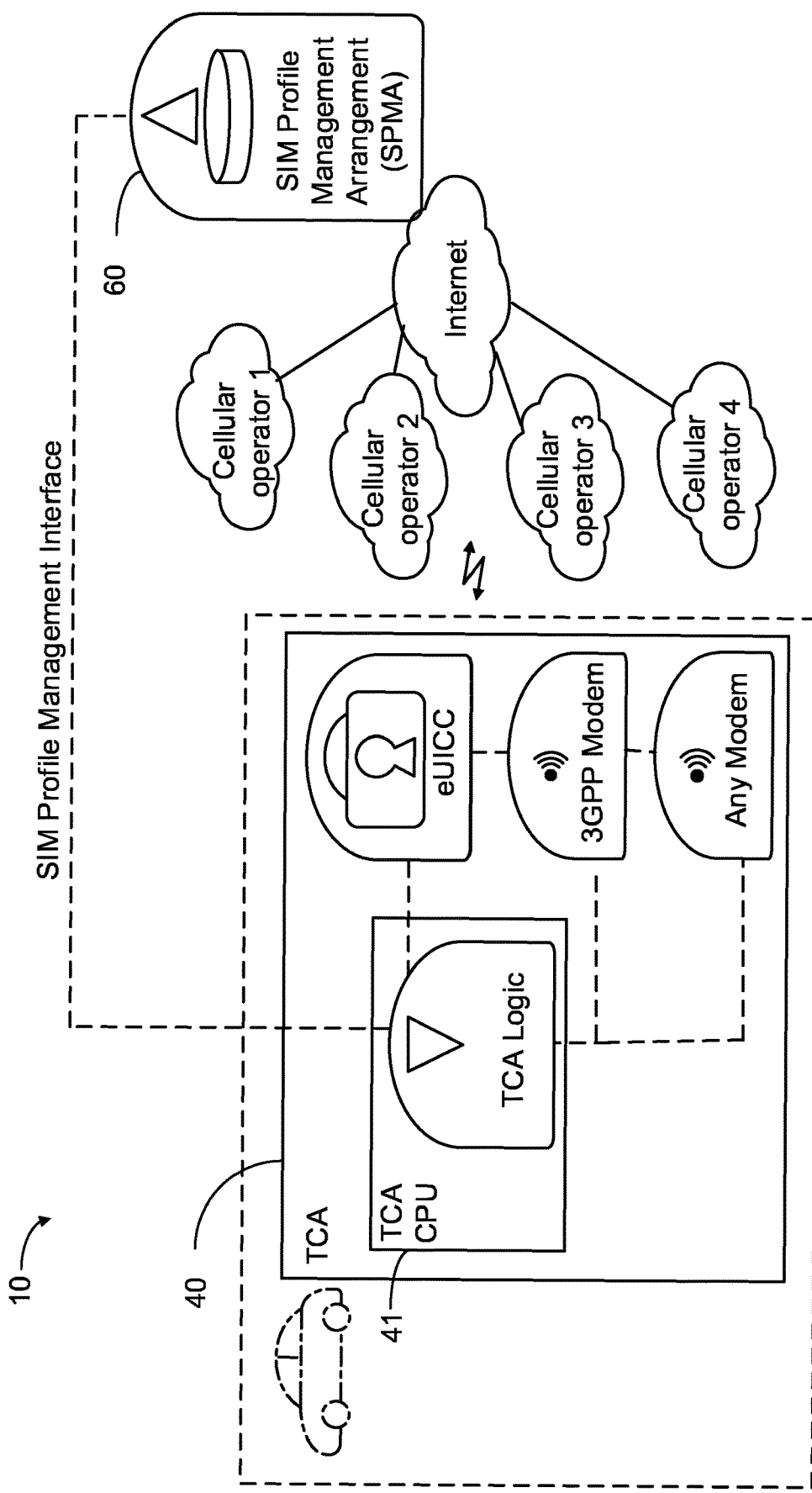
FIG. 2 is a schematic block diagram illustrating an example SIM profile management system scenario relevant in relation to some embodiments.

FIG. 2 illustrates an example SIM profile management system scenario relevant in relation to some embodiments. A telematics control arrangement (TCA) 40 contains processing circuitry 41, e.g., a CPU, that implements the general functions and logic of the TCA. It also contains a 3GPP modem which the TCA may use for communication with any of the cellular networks to access the internet. The TCA CPU is also used to control the modem, e.g. by triggering a switch of SIM profile in the eUICC the modem can be set to communicate over the most appropriate of the available cellular operators. The TCA 40 will be presented below with reference to FIGS. 4a and 4b and is only limited by the features disclosed in FIGS. 4a and 4b. The TCA 40 communicates with a SIM profile management arrangement (SPMA) 60, e.g., a SIM profile management server. The SPMA will be presented below with reference to FIGS. 6a and 6b and is only limited by the features disclosed in FIGS. 6a and 6b.

Turning back to the disclosure of FIG. 2, the TCA 40 will provide the SPMA 60 with general information relevant to determining the most appropriate set of SIM profiles to have downloaded, e.g., to have downloaded in an eUICC/iUICC or soft SIM application. A few examples of such information are, e.g. geographical location of the TCA and available networks (obtained from a network scan performed by the modem or via actively attaching to a network). Additional examples of next level of information indicating the current location of the TCA include selected parts of PLMN-ID(s) of detected networks (i.e. Mobile Country Code (MCC) and/or Mobile Network Code (MNC)), cell global identities (CGI), mobility beam identifiers, detected Wi-Fi Access Points, detected Bluetooth communication devices or any other information detected using any Near Field Communication (NFC) techniques. The SPMA 60 selects the most appropriate set of SIM profiles for a particular TCA. Selection of a set of profiles may be based on various aspects, e.g., based on information obtained or received from the TCA and additional information. Exemplifying aspects for profile selection are available profiles (based on operator agreements), cost of communication when using a specific profile as well as statistics, e.g., related to network performance, of successfully used profiles by other TCAs in similar operating conditions. This disclosure relates to the case when all SIM profiles that are downloaded to the TCA are accessible by every 3GPP modem in the TCA, but also to the case of downloading the most appropriate set of SIM profiles for a particular 3GPP modem in the TCA when SIM profiles accessible by a specific 3GPP modem may be different for different 3GPP modems in the TCA.

If the set of profiles that the SPMA deems most appropriate differs from what is present in the specific TCA and/or 3GPP modem, it may initiate deletion/addition of SIM profiles using general mechanisms, e.g., as specified in GSMA SGP.22 for "Remote SIM Provisioning (RSP) Architecture for consumer Devices' also known as Consumer Profile and SGP.11 "Remote Provisioning Architecture for Embedded UICC Test Specification" also known as M2M profile (see http://www.gsma.com/rsp/).

Figure 3:
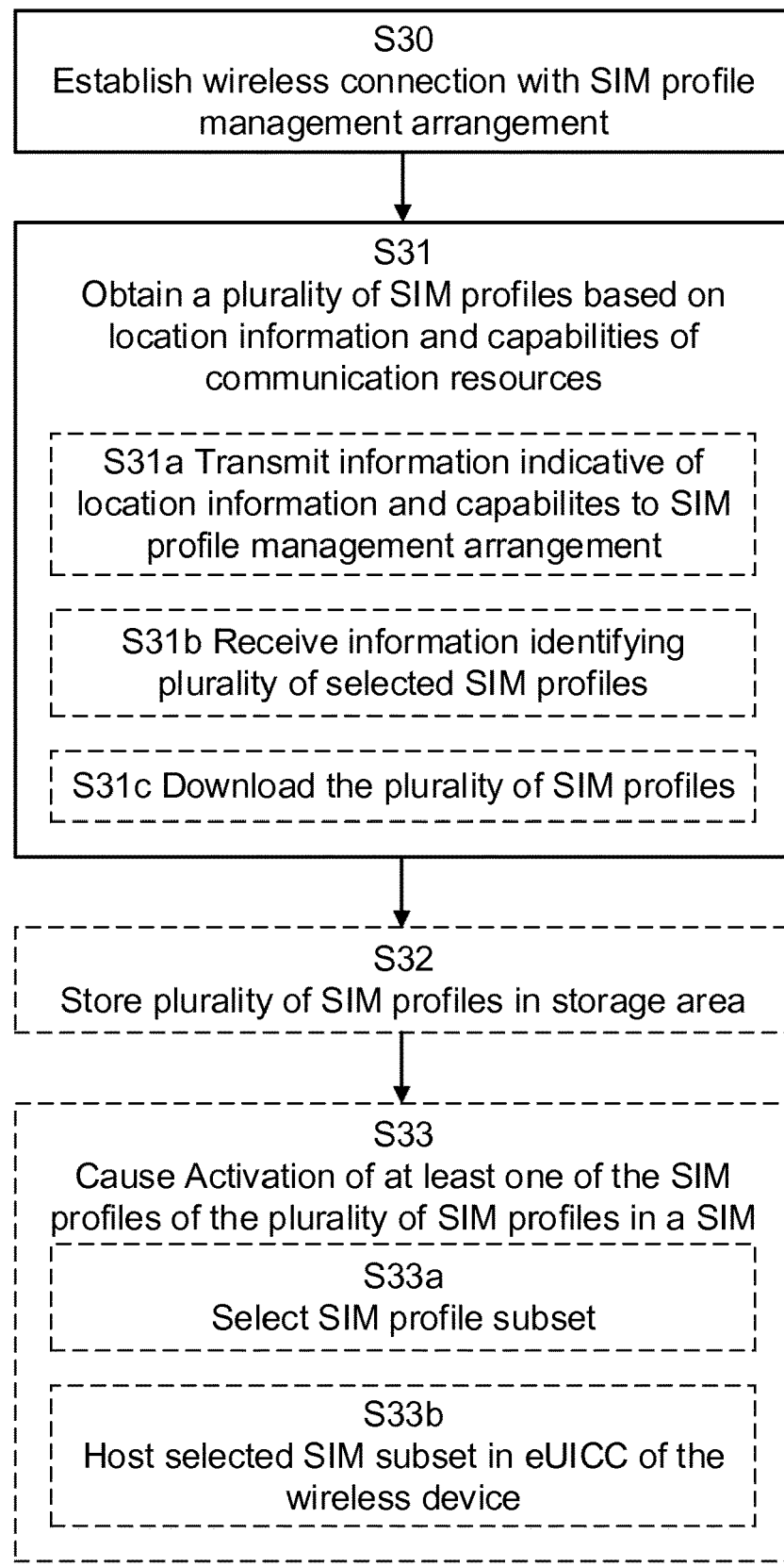
FIG. 3 is a flowchart illustrating example method steps performed in a telematics control arrangement according to some embodiments.

FIG. 3 is a flowchart illustrating example method steps performed in a telematics control arrangement (TCA) according to some embodiments. According to some embodiments, the telematics control arrangement is comprised in a wireless device. As disclosed in FIG. 2, the TCA may be comprised in a transport vehicle, e.g., a delivery truck or a car. According to some embodiments, the TCA is wearable, e.g., by a person or attached to an item or goods.

There is an increasing interest in 'global connectivity' solutions, i.e. solutions which are not restricted to specific national PLMNs alone or the national PLMNs in collaboration with their selected international Roaming partners. Shipping and Freight industries, car manufacturers, emerging IoT (Internet of Things) applications often want one global communication solution. This solution may, depending on e.g. commercial agreements, use almost any PLMN. This solution should also change from one 'active PLMN' to another, e.g. when the TCA, carried by a car or wearable device, travels across a border, e.g., a border between geographical areas such as countries, states, and provinces.

In an initial step S30, a wireless connection is established with at least one SIM profile management arrangement SPMA e.g., through providing connectivity between the TCA logic and SIM profile management arrangement of FIG. 2. According to some embodiments, the wireless connection to the SPMA is established using access credentials of a default SIM profile, e.g., from Cellular operator 1 according to the disclosure of FIG. 2.

In its most general form, the method for remote subscriber identification module, SIM, profile provisioning of the telematics control arrangement also comprises the step S31 of obtaining a plurality of SIM profiles from at least one SIM profile management arrangement out of one or more SIM profile management arrangements based on location information for the telematics control arrangement and/or on capabilities of wireless communication resources accessible to the telematics control arrangement, wherein each SIM profile comprises personalized SIM information for communication in at least one wireless communication network of a respective service provider.

According to some embodiments, the obtaining of plurality of SIM profiles comprises triggering a new set of SIM profiles from the SPMA, e.g., by a step S31a of transmitting information to the SIM profile management arrangement for SIM profile provisioning. According to some embodiments, the transmission of information to the SIM profile management arrangement is triggered in response to operations performed by the telematics control arrangement.

A number of triggers on the TCA side (TCA Logic side) may be interpreted as a request for a new set of SIM Profiles. The trigger may be local in the TCA Logic, for example when the TCA is rebooting and the TCA Logic is started, the TCA has moved a distance, or a time since previous update has expired. The trigger may also come from the SPMA. Location information is retrieved to support the obtaining of a relevant new set of SIM Profiles. Thus, the transmitted information may be indicative of the location information for the telematics control arrangement and of the capabilities of wireless communication resources accessible to the telematics control arrangement.

According to some embodiments, the location information comprises at least one of 3GPP location information, network location information and wireless device location information. The location information may of course be collected for all 3GPP modems and all other modems in the TCA. FIG. 2 shows only one 3GPP modem and one "Any modem", e.g., a Wi-Fi, CDMA or other non-3GPP access technology modem, but the same principle applies also when there are multiple modems of any type in the TCA. The collecting of location information may happen in any order and only a subset of sources may be used to retrieve the location information.

In a scenario, e.g., in accordance with FIG. 2, the TCA Logic requests all 3GPP modems to collect 3GPP Location Information; thus, the 3GPP modem collects the needed location information. This may be performed by just reading broadcasted system information or by actively connecting to the network and thereby receiving even more information. The 3GPP modem provides a response with the 3GPP Location Information to TCA Logic. The 3GPP modem may also return its capabilities, but these may also be available to the TCA Logic by other means. Modem capabilities include frequency band and RAT capabilities.

TCA Logic may also request all other modems to collect any network location information, here illustrated as a request to the Any modem, wherein the Any modem represents any other non-3GPP access technology modem capable of providing wireless connectivity, e.g., a Wi-Fi, CDMA modem. The Any modem collects the needed information. This may be performed by just reading broadcasted information or by actively connecting to the network and thereby receiving even more information. The Any modem may provide a response with the Any network location information to the TCA Logic. The TCA logic may also provide a request to all positioning devices to collect Location Information.

According to some embodiments, the TCA reports all collected network location information to the SPMA as indication to select the most appropriate set of SIM Profiles for the TCA and/or 3GPP modem(s).

The SPMA uses received location information, modem capabilities and any other information available to select most appropriate set of SIM Profiles for TCA or 3GPP modem(s). The SPMA transmits information identifying the plurality of selected SIM profiles, i.e., the set of SIM profiles, to the TCA. Consequently, the TCA receives S31b information from the SIM profile management arrangement identifying the plurality of selected SIM profiles.

According to some embodiments, the obtaining of a plurality of SIM profiles comprises downloading S31c the plurality of SIM profiles from the SPMA, wherein the plurality of SIM profiles represents a most appropriate set of SIM profiles. The criteria to select the most appropriate set of SIM profiles can include a multitude of factors, e.g.:

eUICC memory size, i.e. how many SIM profiles it can store. This can be sent as part of 'modem capabilities' if e.g. the Consumer profile is used and the modem acquires 'Extended Card resources information' via (ES10b): GetEUICCInfo.

Cost of loaded SIM profiles, active or not

Knowledge of performance and band/RAT support per network (network corresponding to each individual SIM Profile) in the current or predicted TCA location/area Need for SIM profiles with particularly wide roaming agreements (specific for Consumer variant, where such a profile can be activated when other eUICC loaded SIM profiles fail to connect successfully)

According to some embodiments, the SPMA triggers download S31c of the selected set of SIM Profiles to the TCA or 3GPP modem(s), i.e. deletion of SIM Profiles and/or addition SIM Profiles. According to some embodiments, the method for remote SIM profile provisioning comprises storing S32 a plurality of SIM profiles in a storage area of the telematics control arrangement. Thus, the selected set of SIM Profiles may be downloaded to the TCA or 3GPP modem(s) and stored. In case where machine to machine, M2M, procedures are used, the signaling and SIM Profile transfer will be done individually per 3GPP modem.

According to some embodiments, the method further comprises the step S33 of causing activation in a TCA SIM of at least one of the SIM profiles of the obtained plurality of SIM profiles. Method aspects of causing the activation comprises selecting S33a a SIM profile subset comprising one or more SIM profiles from the obtained plurality of SIM profiles and hosting S33b the selected SIM profile subset in an Universal Integrated Circuit Card, eUICC, or in an integrated UICC (iUICC) of the wireless device.

It should be appreciated that FIG. 3 comprises some operations which are illustrated with a darker border and some operations which are illustrated with a dashed border. The operations which are comprised in a darker border are operations which are comprised in the broadest, generic example embodiment. The operations which are comprised in a dashed border are example embodiments and represent optional operations that may be added to the broadest, generic example embodiment. In some implementations and according to some aspects of the disclosure, functions disclosed as performed in a certain order in a block of the block diagram can occur out of the order, accordingly, it should be appreciated that the operations do not need to be performed in order. Furthermore, it should be appreciated that optional operations are truly optional, and as such do not need to be performed, nor be performed at all, in order to arrive at the above disclosed object of the present disclosure. Furthermore, the example operations may be performed in any order and in any combination.

The various example embodiments described herein are described in the general context of method steps or processes, which may be implemented in one aspect by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Generally, program modules may include routines, programs, objects, components, data structures, etc. that perform particular tasks or implement particular abstract data types. Computer-executable instructions, associated data structures, and program modules represent examples of program code for executing steps of the methods disclosed in FIG. 3. The particular sequence of such executable instructions or associated data structures represents examples of corresponding acts for implementing the functions described in such steps or processes.

Figure 4A:
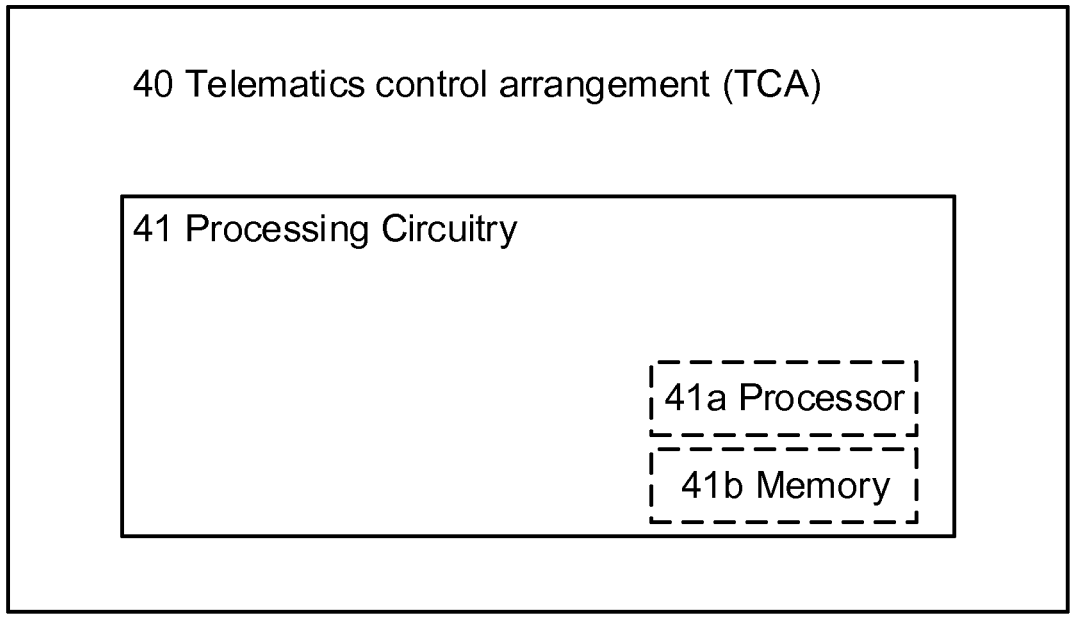
FIG. 4
a. is a schematic block diagram illustrating an example telematics control arrangement according to some embodiments;
b. is a schematic block diagram illustrating an example telematics control arrangement according to some embodiments.

FIG. 4a illustrates an example telematics control arrangement (TCA) 40, which may perform some or all of the example method embodiments discussed above. According to an aspect of the disclosure, the telematics control arrangement comprises a computer readable storage medium, storing a computer program which, when executed causes the TCA to execute any or all of the above discussed example embodiments.

The TCA may be comprised in a wireless device and be configured for remote subscriber identification module (SIM) profile provisioning. As shown in FIG. 4a, the TCA comprises processing circuitry 41, arranged to control operation of the TCA. In particular, the processing circuitry 41 controls remote SIM profile provisioning of the TCA. The processing circuitry 41 is arranged for establishing a wireless connection with at least one SIM profile management arrangement; and for obtaining a plurality of SIM profiles from at least one SIM profile management arrangement based on location information for the telematics control arrangement and on capabilities of wireless communication resources accessible to the telematics control arrangement, wherein each SIM profile comprises personalized SIM information for communication in at least one wireless communication network of a respective service provider.

According to an aspect of the disclosure, the processing circuitry comprises a processor 41a and a memory 41b. The processor 41a may be any suitable type of computation unit or circuit, e.g. a microprocessor, digital signal processor, DSP, field programmable gate array, FPGA, or application specific integrated circuit, ASIC or any other form of circuitry. It should be appreciated that the processing circuitry need not be provided as a single unit but may be provided as any number of units or circuitry.

The memory 41b, e.g., an eUICC or an iUICC, may be configured to store the obtained plurality of SIM profiles. The memory 41b may further be configured to store received or transmitted data and/or executable program instructions. The memory 41b may be any suitable type of computer readable memory and may be of volatile and/or non-volatile type.

Figure 4B:
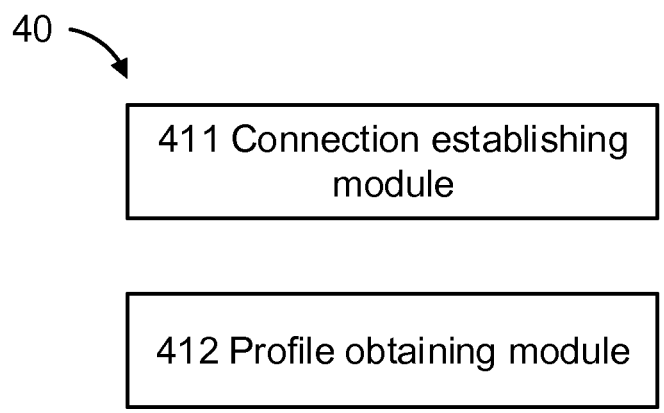

FIG. 4b illustrates an example telematics control arrangement (TCA) 40, which may incorporate some of the example embodiments discussed above. The TCA is configured for remote SIM profile provisioning. The TCA comprises a connection establishing module 411 configured for establishing a wireless connection with at least one SIM profile management arrangement. The TCA also comprises a profile obtaining module 412 configured for obtaining a plurality of SIM profiles from at least one SIM profile management arrangement based on location information for the telematics control arrangement and on capabilities of wireless communication resources accessible to the telematics control arrangement, wherein each SIM profile comprises personalized SIM information for communication in at least one wireless communication network of a respective service provider.

It should be understood that entities in the drawings, e.g., blocks of the block diagrams, and also combinations of entities in the drawings, can be implemented by computer program instructions, which instructions can be stored in a computer-readable memory, and also loaded onto a computer or other programmable data processing apparatus. Such computer program instructions can be provided to a processor of a general purpose computer, a special purpose computer and/or other programmable data processing apparatus to produce a machine, such that the instructions, which execute via the processor of the computer and/or other programmable data processing apparatus, create means for implementing the functions/acts specified in the block diagrams and/or flowchart block or blocks.

Figure 5:
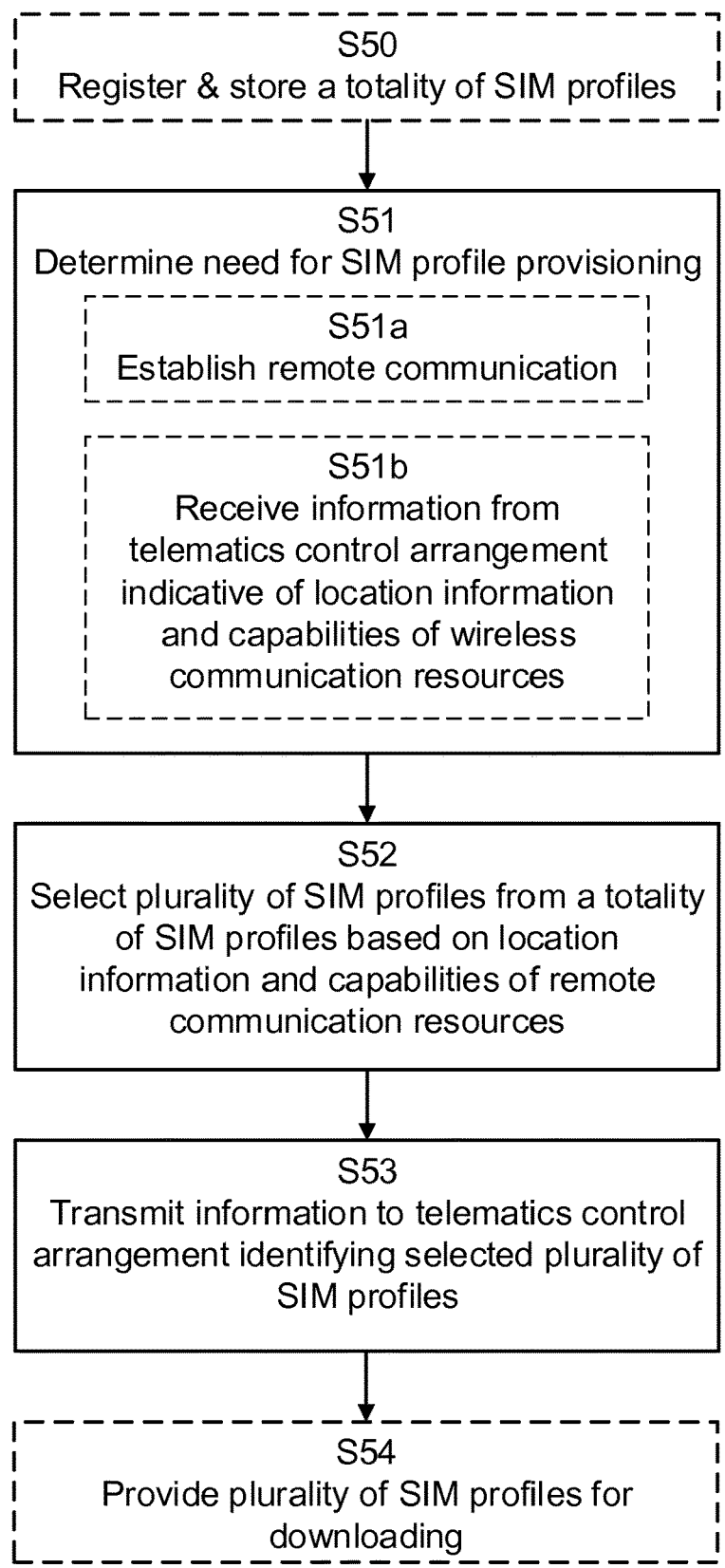
FIG. 5 is a flowchart illustrating example method steps performed in a SIM profile management arrangement according to some embodiments.

FIG. 5 is a flowchart illustrating the above disclosed method for remote SIM profile provisioning from a SIM profile management arrangement (SPMA) perspective. The flowchart illustrates example method steps performed in a SPMA according to some embodiments. In an optional, initial step S50, a totality of SIM profiles is registered in the SIM profile management arrangement, wherein each SIM profile comprises personalized SIM information for communication in at least one wireless communication network of a respective service provider. The totality of SIM profiles represents a set of SIM profiles that is greater than the plurality of SIM profiles that may be provisioned to the TCA.

In a step S51, the SPMA determines a need for SIM profile provisioning to the telematics control arrangement. In some embodiments, determining a need for SIM profile provisioning comprises to establish S51a a wireless connection with the telematics control arrangement; and receiving S51b information from the telematics control arrangement, wherein the received information is indicative of the location information for the telematics control arrangement and the capabilities of wireless communication resources accessible to the telematics control arrangement. In some embodiments, the wireless connection to the SPMA is established using access credentials of a default SIM profile and may be initiated from the telematics control arrangement.

In its most general form, the method for remote SIM, profile provisioning of the telematics control arrangement also comprises a step S52 of selecting a plurality of SIM profiles from a totality of SIM profiles registered in the SIM profile arrangement, wherein the selecting is based on location information for the telematics control arrangement and capabilities of wireless communication resources accessible to the telematics control arrangement. In a subsequent step S53, the SPMA causes transmission of information to the telematics control arrangement identifying the selected plurality of SIM profiles.

According to some embodiments, location information comprises at least one of 3GPP location information, network location information and wireless device location information.

According to some embodiments, the method of the SPMA for remote SIM, profile provisioning of the TCA further comprises the step S54 of providing the selected plurality of SIM profiles for downloading by the TCA. According to some embodiments, a customer profile is registered in the SPMA, wherein the customer profile comprises customer information and is associated with access credentials. According to some embodiments the customer profile is also related to the TCA or the entity hosting the TCA, e.g., a car. The selected plurality of SIM profiles is provided for downloading when retrieving access credentials corresponding to a registered customer profile.

It should be appreciated that FIG. 5 comprises some operations which are illustrated with a darker border and some operations which are illustrated with a dashed border. The operations which are comprised in a darker border are operations which are comprised in the broadest, generic example embodiment. The operations which are comprised in a dashed border are example embodiments and represent optional operations that may be added to the broadest, generic example embodiment. In some implementations and according to some aspects of the disclosure, functions disclosed as performed in a certain order in a block of the block diagram can occur out of the order, accordingly, it should be appreciated that the operations do not need to be performed in order. Furthermore, it should be appreciated that optional operations are truly optional, and as such do not need to be performed, nor be performed at all, in order to arrive at the above disclosed object of the present disclosure. Furthermore, the example operations may be performed in any order and in any combination.

The various example embodiments described herein are described in the general context of method steps or processes, which may be implemented in one aspect by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Generally, program modules may include routines, programs, objects, components, data structures, etc. that perform particular tasks or implement particular abstract data types. Computer-executable instructions, associated data structures, and program modules represent examples of program code for executing steps of the methods disclosed in FIG. 5. The particular sequence of such executable instructions or associated data structures represents examples of corresponding acts for implementing the functions described in such steps or processes.

Figure 6A:
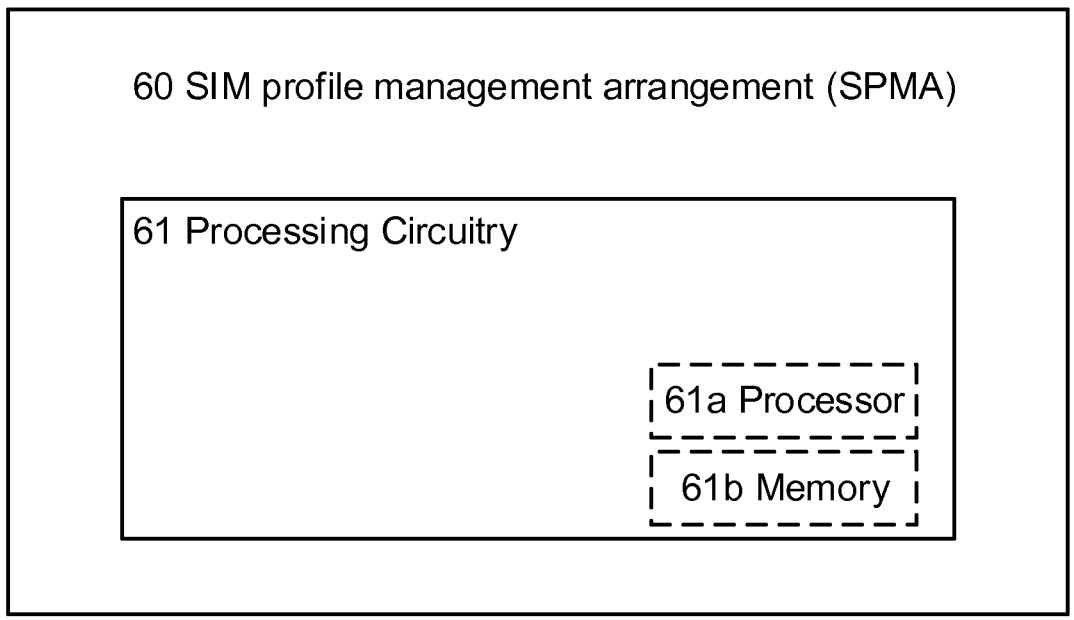
FIG. 6
a. is a schematic block diagram illustrating an example SIM profile management arrangement according to some embodiments;
b. is a schematic block diagram illustrating an example SIM profile management arrangement according to some embodiments.

FIG. 6a illustrates an example SIM profile management arrangement (SPMA) which may perform some or all of the example method embodiments discussed above. According to an aspect of the disclosure, the SPMA comprises a computer readable storage medium, storing a computer program which, when executed causes the SPMA to execute any or all of the above discussed example embodiments.

FIG. 6a illustrates an example configuration for a SIM Profile Management arrangement 60 according to some embodiments. According to an aspect of the disclosure, a SPMA 60 configured for remote subscriber identification module, SIM, profile provisioning, comprises processing circuitry 61 configured to cause the telematics control arrangement to determine a need for SIM profile provisioning to the telematics control arrangement. The processing circuitry 60 is configured to select a plurality of SIM profiles from a totality of SIM profiles registered in the SIM profile arrangement, wherein the selecting is based on location information for the telematics control arrangement and capabilities of wireless communication resources accessible to the telematics control arrangement. The processing circuitry is further configured to cause transmission of information to the telematics control arrangement identifying the selected plurality of SIM profiles.

According to an aspect of the disclosure, the processing circuitry comprises a processor 61a and a memory 61b. The processor 61a may be any suitable type of computation unit or circuit, e.g. a microprocessor, digital signal processor, DSP, field programmable gate array, FPGA, or application specific integrated circuit, ASIC or any other form of circuitry. It should be appreciated that the processing circuitry need not be provided as a single unit but may be provided as any number of units or circuitry.

The memory 61b may be configured to maintain a register and store the totality of SIM profiles. The memory 61b may further be configured to store received or transmitted data and/or executable program instructions. The memory 61b may be any suitable type of computer readable memory and may be of volatile and/or non-volatile type.

Figure 6B:
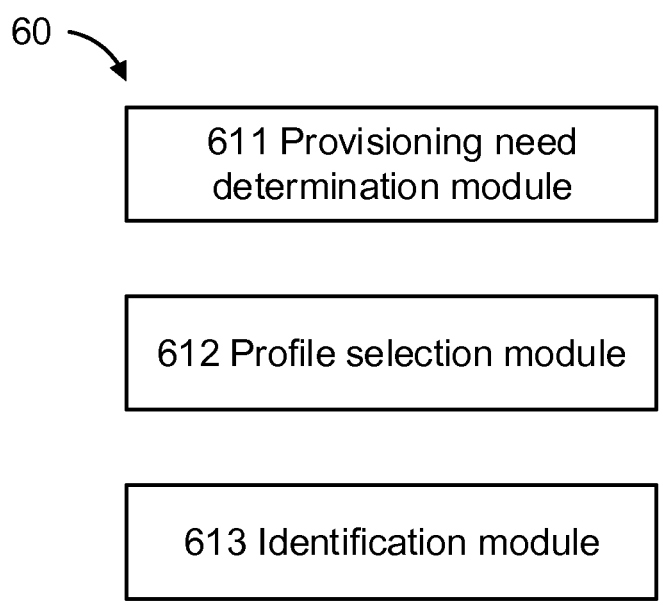

FIG. 6b illustrates an SIM profile management arrangement 60, which may incorporate some of the example embodiments discussed above. The SPMA 60 comprises a provisioning need determination module 611 for determining a need for SIM profile provisioning to the telematics control arrangement; a profile selection module 612 for selecting a plurality of SIM profiles from a totality of SIM profiles registered in the SIM profile arrangement, wherein the selecting is based on location information for the telematics control arrangement and capabilities of wireless communication resources accessible to the telematics control arrangement; and an identification module 613 for causing transmission of information to the telematics control arrangement to identify the selected plurality of SIM profiles.

It should be understood that entities in the drawings, e.g., blocks of the block diagrams, and also combinations of entities in the drawings, can be implemented by computer program instructions, which instructions can be stored in a computer-readable memory, and also loaded onto a computer or other programmable data processing apparatus. Such computer program instructions can be provided to a processor of a general purpose computer, a special purpose computer and/or other programmable data processing apparatus to produce a machine, such that the instructions, which execute via the processor of the computer and/or other programmable data processing apparatus, create means for implementing the functions/acts specified in the block diagrams and/or flowchart block or blocks.

Figure 7:
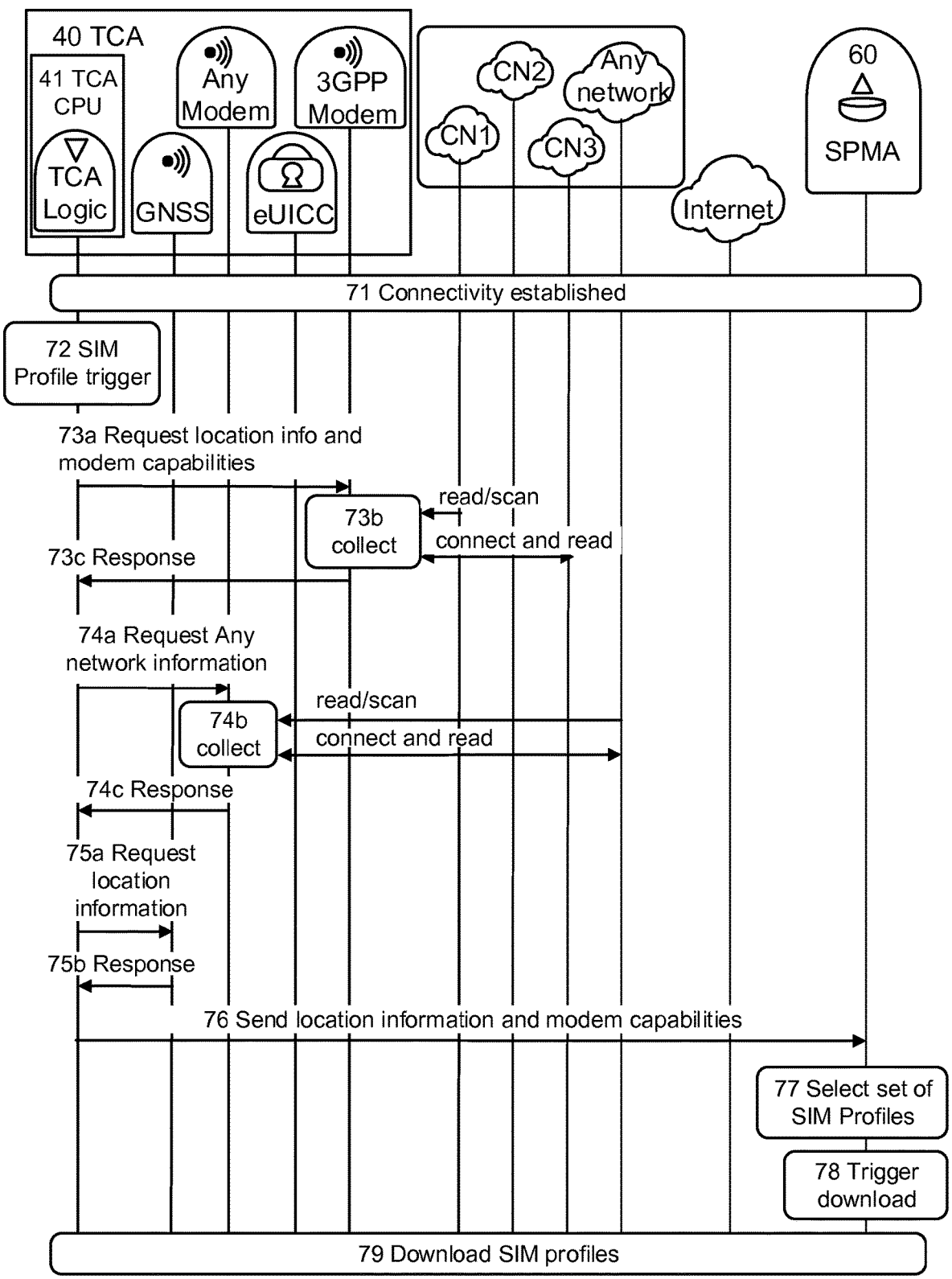
FIG. 7 is a schematic signalling diagram illustrating an example signalling flow in the SIM profile management system, e.g., as disclosed in FIG. 2.

FIG. 7 illustrates high-level example of operations and signalling flow/interaction according to some SIM provisioning aspects and embodiments of the present disclosure. In the disclosure of FIG. 7, some elements are represented as abbreviated: a telematics control arrangement (TCA), cellular networks (CN), a Global Navigation Satellite System (GNSS), module, a SIM profile management arrangement (SPMA).

Initially, in operation 71, connectivity is established between TCA Logic 40 and SPMA 60. This connectivity may be based on any of the modems in the TCA side (and related access credentials) and any network (either 3GPP or non-3GPP based networks). In the disclosure of FIG. 7 this is shown as a first operation, but it should be appreciated that the connection establishment may also happen later. The only prerequisite is that operation 71 takes place before operation 76.

Operation 72 represents the SIM profile trigger. Any trigger on TCA Logic side happens to request a new set of SIM Profiles from the SPMA. This trigger may be local in the TCA Logic, for example when the TCA is rebooting and the TCA Logic is started, the TCA has moved a distance, or a time since previous update has expired. The trigger may also come from the SPMA (and in this case operation 71 needs to take place before). Location information needs to be retrieved for the request for new set of SIM Profiles. The location information is collected in operations 73-75 and is performed for all 3GPP modems and all other modems in the TCA. In addition to the signalling disclosed in FIG. 7, location information may also be collected from the GNSS module. FIG. 7 only shows one 3GPP modem and one "Any modem" but the same principle applies also when there are multiple modems of any type in the TCA. Operations 73 to 75 can happen in any order and only a subset of sources may be used, i.e. some steps may be omitted.

Location information is collected in the TCA 40. In the disclosed scenario, the TCA Logic sends a requests 73a to one or more 3GPP modems to collect 3GPP Location Information from the 3GPP modem. The respective 3GPP modem collects 73b the needed location information. This may be performed by just reading broadcasted system information or by actively connecting to the network and thereby receiving even more information. The 3GPP modem provides a response with the 3GPP Location Information to TCA Logic in a response signal 73c. The 3GPP modem may also return its capabilities or make these available to the TCA logic by other means Modem capabilities include frequency band and RAT capabilities.

The TCA also collects network location information from other modems, e.g., by sending a request 74a for network location information to Any modem. The Any modem collects the needed information as disclosed in operation 74b. This may be performed by just reading broadcasted information or by actively connecting to the network and thereby receiving even more information. The Any modem provides a response with the Any network location information to the TCA Logic in a response 74c.

In a scenario where positioning devices, e.g., Global Navigation Satellite System, GNSS, devices, are available, the TCA requests 75a location information also from these devices and receives a response 75b.

When comprehensive location information has been gathered by the TCA, a message 76 comprising the location information is sent to the SPMA. The TCA Logic reports some or all collected network location information to the SPMA as indication to select the most appropriate set of SIM Profiles for the TCA and/or 3GPP modem(s). TCA logic may also report Modem capabilities to the SPMA.

In operation 77, the SPMA uses the received location information, modem capabilities and any other information available to the SPMA to select most appropriate set of SIM Profiles for TCA or 3GPP modem(s).

In operation 78, the SPMA triggers download of the selected set of SIM Profiles to the TCA or 3GPP modem(s) (i.e. deletion of SIM Profiles and/or addition SIM Profiles), and the selected set of SIM Profiles is downloaded to the TCA or 3GPP modem(s) in operation 79. In case the M2M procedures are used, the signalling and SIM Profile transfer in operation 79 will be done individually per 3GPP modem.

The criteria in operation 77 to select the most appropriate set of SIM profiles can include a multitude of factors, e.g.:
  eUICC memory size, i.e. how many SIM profiles it can store. This can be sent as part of 'modem capabilities' if e.g. the Consumer profile is used and the modem acquires 'Extended Card resources information' via (ES10b): GetEUICCInfo.
  Cost of loaded SIM profiles, active or not
  Knowledge of performance and band/RAT support per network (network corresponding to each individual SIM Profile) in the current or predicted TCA location/area
  Need for SIM profiles with particularly wide roaming agreements (specific for Consumer variant, where such a profile can be activated when other eUICC loaded SIM profiles fail to connect successfully)

Keeping the "right" set of profiles available in the eUICC/iUICC secures reliable access to communication at a controlled cost. A too small set of profiles may limit access to communication by not having the appropriate profile available when needed. On the other hand, having an excess of profiles stored on the eUICC/iUICC may incur unnecessary cost.

The description of the example embodiments provided herein have been presented for purposes of illustration. The description is not intended to be exhaustive or to limit example embodiments to the precise form disclosed, and modifications and variations are possible in light of the above teachings or may be acquired from practice of various alternatives to the provided embodiments. The examples discussed herein were chosen and described in order to explain the principles and the nature of various example embodiments and its practical application to enable one skilled in the art to utilize the example embodiments in various manners and with various modifications as are suited to the particular use contemplated. The features of the embodiments described herein may be combined in all possible combinations of source nodes, target nodes, corresponding methods, and computer program products. It should be appreciated that the example embodiments presented herein may be practiced in combination with each other.

The invention claimed is:

1. A method for remote subscriber identification module (SIM) profile provisioning of a telematics control arrangement comprisable in a wireless device, the method comprising:
   establishing a wireless connection with one or more SIM profile management arrangements;
   providing a request to the one or more SIM profile management arrangements to obtain a new set of SIM profiles from at least one of the one or more SIM profile management arrangements;
   retrieving, from modems in the telematics control arrangement, location information for the request; and
   obtaining a plurality of SIM profiles from at least one of the one or more SIM profile management arrangements, the plurality of SIM profiles being appropriate for all modems or for a particular modem of the telematics control arrangement and are selected based on the location information retrieved for the telematics control arrangement, and the capabilities of wireless communication resources comprise modem capabilities,
   each SIM profile comprising personalized SIM information for communication in at least one wireless communication network of a respective service provider, the obtaining comprising:
      transmitting information to the at least one SIM profile management arrangement for SIM profile provisioning, the information being indicative of the location information for the telematics control arrangement;
      receiving information from the at least one SIM profile management arrangement identifying the plurality of SIM profiles; and
      downloading the plurality of SIM profiles from the at least one SIM profile management arrangement.

2. The method of claim 1, wherein transmitting information to the SIM profile management arrangement is triggered by receipt of a triggering signal from the at least one SIM profile management arrangement.

3. The method of claim 1, wherein transmitting information to the at least one SIM profile management arrangement is triggered in response to operations performed by the telematics control arrangement.

4. The method of claim 1, wherein the location information comprises at least one of 3GPP location information, network location information and wireless device location information.

5. The method of claim 1, wherein the plurality of SIM profiles is comprised in the information received from the at least one SIM profile management arrangement.

6. The method of claim 1, wherein the telematics control arrangement is comprised in a wireless device.

7. The method of claim 1, wherein the wireless connection to the one or more SIM profile management arrangements is established using access credentials of a default SIM profile.

8. The method of claim 1, the method further comprising:
   storing the plurality of SIM profiles in the telematics control arrangement.

9. The method of claim 1, the method further comprising:
   causing activation in a SIM of at least one of the obtained plurality of SIM profiles.

10. The method of claim 9, wherein causing activation in the SIM of at least one of the obtained plurality of SIM profiles comprises:
    selecting a SIM profile subset comprising one or more SIM profiles from the obtained plurality of SIM profiles; and
    hosting the selected SIM profile subset in an embedded Universal Integrated Circuit Card (eUICC) or in an integrated UICC (iUICC) of the wireless device.

11. The method of claim 1 wherein the telematics control arrangement is wearable or comprised in a transport vehicle.

12. The method of claim 1, wherein obtaining the plurality of SIM profiles from the least one of the one or more SIM profile management arrangements is further based on capabilities of wireless communication resources accessible to the telematics control arrangement.

13. A telematics control arrangement configured for remote subscriber identification module (SIM) profile provisioning, the telematics control arrangement comprising:
    processing circuitry configured to cause the telematics control arrangement to:
       establish a wireless connection with one or more SIM profile management arrangements;
       provide a request to the one or more SIM profile management arrangements to obtain a new set of SIM profiles from at least one of the one or more SIM profile management arrangements;
       retrieve, from modems in the telematics control arrangement, location information for the request; and
       obtain a plurality of SIM profiles from at least one of the one or more SIM profile management arrangements, the plurality of SIM profiles are appropriate for all modems or for a particular modem of the telematics control arrangement and are selected based on the location information retrieved for the telematics control arrangement, the capabilities of wireless communication resources comprise modem capabilities, and
       each SIM profile comprising personalized SIM information for communication in at least one wireless communication network of a respective service provider, the obtaining comprising:
          transmitting information to the at least one SIM profile management arrangement for SIM profile provisioning, the information being indicative of the location information for the telematics control arrangement;
          receiving information from the at least one SIM profile management arrangement identifying the plurality of SIM profiles; and
          downloading the plurality of SIM profiles from the at least one SIM profile management arrangement.

14. A method of a subscriber identification module (SIM) profile management arrangement for remote SIM profile provisioning to a telematics control arrangement comprisable in a wireless device, the method comprising:

determining a need for SIM profile provisioning to the telematics control arrangement based on a request, received from the telematics control arrangement, for a new set of SIM profiles from the SIM profile management arrangement;

selecting a plurality of SIM profiles representing a most appropriate set of SIM profiles from a totality of SIM profiles registered in the SIM profile management arrangement, the plurality of SIM profiles are appropriate for all modems or for a particular modem of the telematics control arrangement, the selecting is based on location information for the telematics control arrangement, and based on capabilities of wireless communication resources accessible to the telematics control arrangement, and the capabilities of wireless communication resources comprise modem capabilities; and causing transmission of information to the telematics control arrangement identifying the selected plurality of SIM profiles.

15. The method of claim 14, wherein the location information comprises at least one of 3GPP location information, network location information and wireless device location information.

16. The method of claim 14, further comprising storing the totality of SIM profiles registered in the SIM profile management arrangement.

17. The method of claim 14, further comprising providing the selected plurality of SIM profiles for downloading by the telematics control arrangement.

18. The method of claim 17, further comprising:

registering a customer profile in the SIM profile management arrangement, wherein the customer profile comprises customer information and is associated with access credentials; and providing the selected plurality of SIM profiles for downloading when retrieving access credentials corresponding to a registered customer profile.

19. The method of claim 14, wherein the selecting is further based on capabilities of wireless communication resources accessible to the telematics control arrangement.

20. A subscriber identification module (SIM) profile management arrangement (SPMA) configured for remote subscriber identification module (SIM) profile provisioning to a telematics control arrangement comprisable in a wireless device, the SPMA comprising:

processing circuitry configured to cause the SPMA to determine a need for SIM profile provisioning to a telematics control arrangement based on a request, received from the telematics control arrangement, for a new set of SIM profiles from the SPMA;

select a plurality of SIM profiles representing a most appropriate set of SIM profiles from a totality of SIM profiles registered in the SPMA, the plurality of SIM profiles are appropriate for all modems or for a particular modem of the telematics control arrangement, the selecting is based on location information for the telematics control arrangement, and based on capabilities of wireless communication resources accessible to the telematics control arrangement, the capabilities of wireless communication resources comprise modem capabilities; and cause transmission of information to the telematics control arrangement identifying the selected plurality of SIM profiles.

* * * * *